(No Model.)
F. T. JOYCE.
MUSIC LEAF TURNER.
No. 558,496. Patented Apr. 21, 1896.
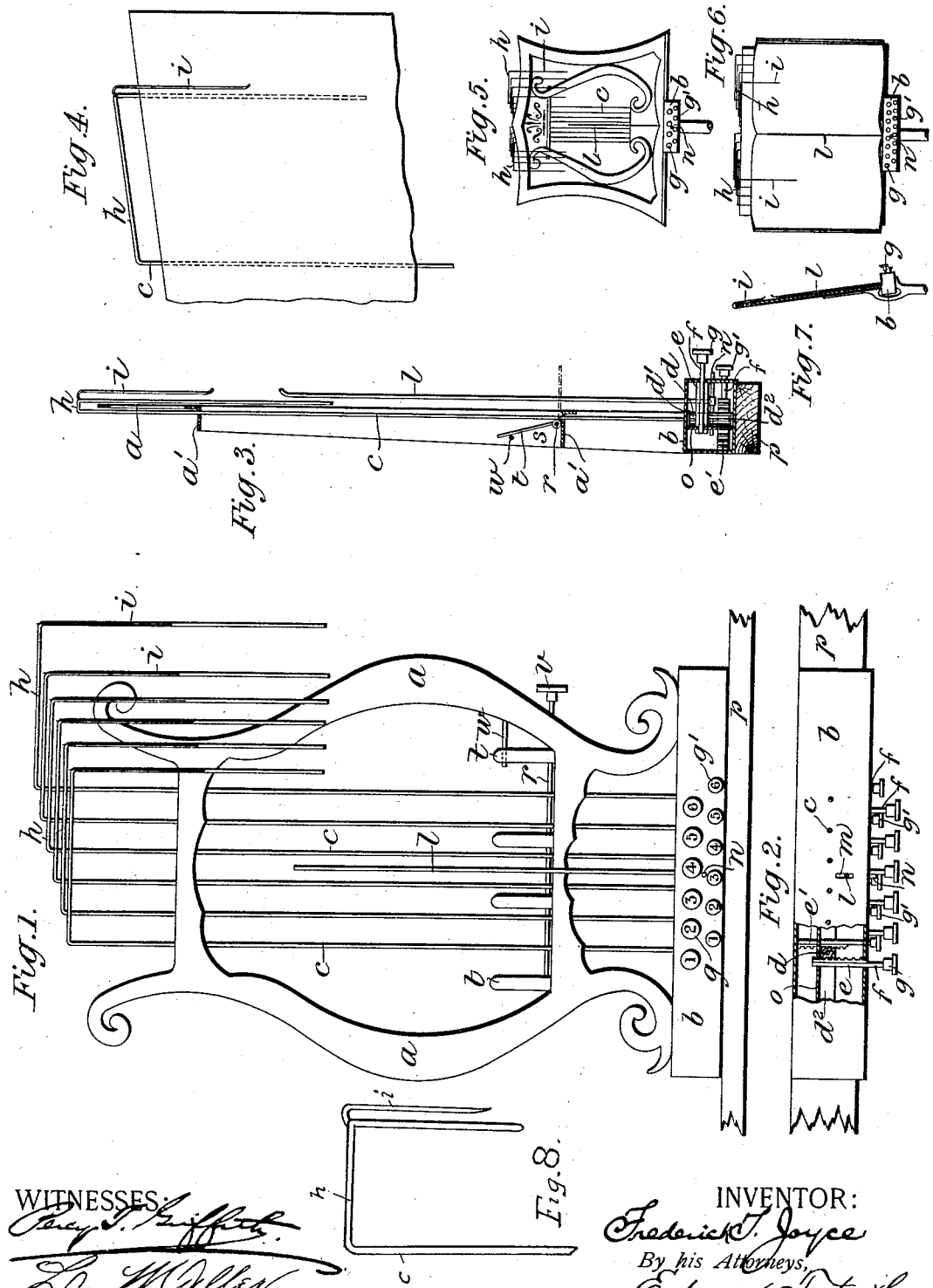
WITNESSES:
INVENTOR:
Frederick T. Joyce
By his Attorneys,
Edgar Tate & Co

UNITED STATES PATENT OFFICE.

FREDERICK TALBOT JOYCE, OF DUBLIN, IRELAND.

MUSIC-LEAF TURNER.

SPECIFICATION forming part of Letters Patent No. 558,496, dated April 21, 1896.

Application filed November 6, 1894. Serial No. 528,048. (No model.) Patented in England May 30, 1893, No. 10,558, and in France March 16, 1894, No. 237,069.

*To all whom it may concern:*

Be it known that I, FREDERICK TALBOT JOYCE, a subject of the Queen of Great Britain and Ireland, and a resident of Lower Baggott Street, Dublin, Ireland, have invented certain new and useful Improvements in Apparatus for Turning the Leaves of Music and the Like, (for which I have obtained a patent in Great Britain, No. 10,558, dated May 30, 1893, and in France, No. 237,069, dated March 16, 1894;) and I do hereby declare the following to be a full, clear, and exact description of the invention, such as will enable others skilled in the art to which it appertains to make and use the same.

My invention relates to music-leaf turners, and has for its object to provide means for successively turning the leaves of a piece of music through the medium of keys to be pressed by the fingers.

In the accompanying sheet of illustrative drawings, Figure 1 is a front elevation of a leaf-turner constructed according to this invention with racks and pinions. Fig. 2 is a sectional plan, and Fig. 3 is a sectional end elevation, of the same. Fig. 4 is a detail in perspective showing the manner in which each leaf is held. Fig. 5 is a front elevation of the desk of an orchestral music-stand permanently fitted with this leaf-turner. Fig. 6 is a front elevation of the desk of an ordinary orchestral music-stand removably fitted with this leaf-turner and showing a piece of music in position, and Fig. 7 is an end elevation of the same. Fig. 8 is a detail view showing the arrangement of the fingers $i$.

The frame $a$ is formed at its lower part with a box $b$, projecting forward so as to form a rest for the bottom edges of the leaves. Mounted in the back of the frame $a$ and passing through holes in the horizontal plates $a'$ $a'$ and projecting above the top edge of the largest-sized music are a series of vertical rods $c$, whose lower ends pass into the box $b$ and are pivoted in holes in the foot-plate $d^2$ and fitted with pinions $d$ and washers $d'$. Racks $e$, sliding horizontally backward and forward in the box, are geared with the pinions $d$ and are operated by spindles $f$, extending through the front side of the box and provided with operating-buttons $g$. The back ends of the racks are guided by the plate $o$. The rods $c$ are provided at their upper ends with arms $h$, and on the end of each arm $h$ is a loop or clip $i$, in which the leaf to be turned is inserted, the other part thereof being secured thereto. This loop or clip, which forms a part of each of the rods $c$ and constitutes the end of the arm $h$ thereof, consists of two parts, as clearly shown in Figs. 1, 3, and 4, one of said parts being considerably shorter than the other, as shown in Figs. 3 and 4. As shown, the rod $c$, arm $h$, and one part of the loop or clip $i$ are formed by bending a rod downwardly and soldering or otherwise attaching a second rod to and parallel with the downwardly-bent portion.

To enable any loop or clip to be more readily turned back—that is, from left to right, as where a page has to be repeated—racks $e'$ are provided similar to the racks $e$ and working reciprocally with them, but at a lower level and on the opposite sides of the pinions $d$.

A vertical rod $l$ is fixed to the top of the box $b$ or it passes through a slot-hole $m$ in the top of the box $b$ and is attached to a rod $n$, sliding through a hole in the face of the box $b$ and through a plate $o$, so that the rod $l$ can be pulled out or pressed in to accommodate itself to different thicknesses of music or the like.

The leaf-turner being placed on any music-desk so that it rests on the ledge $p$ and the loops or clips being turned to the right, the piece of music, open at the center fold, is placed behind the rod $l$. The leaves are then slipped in turn into the loops or clips $i$. To turn a page, the first button $g$ on the left is pressed by the finger, which causes the first loop or clip to rotate from right to left, bringing the leaf with it, and so on in succession till all the leaves have been turned. To return a leaf, its particular "repeat-button" $g'$ on the lower line of racks is pressed in, which causes the loop or clip to revolve from left to right and to carry back the page with it. Two or more pages may be thus instantly returned by pressing in the repeat-button corresponding to the page it is desired to repeat.

Where a large number of loops or clips are required, the rods c are arranged close together, so that the pinion of the one will just clear the spindle of the other, or they may be arranged in a double or treble row or in other ways to economize space or for convenience. In these cases the racks e work at different levels, so as not to interfere with one another, the repeating-racks $e'$ being dispensed with, the repeat action being effected by pulling out with the finger the button corresponding to the leaf required to be repeated. When the repeat action is effected in this way, the apparatus, when not forming a part of a music-desk, is provided with a pair of spring-clips fixed to the box b, by which it can be firmly attached to the ledge of any music-desk. Single leaves may be taken by making a fold at their inner edge and placing them, with the rod l, in the fold. Books, opened where required, are placed in front of the rod l and beneath the loops i. The pages to be turned are then inserted in the loops, as before described.

To render the apparatus suitable for small books and short music, a movable rest is provided, fixed at any suitable height above the top of the box b, and consisting of a horizontal spindle r, passing through and revolving in holes in the vertical web s of the frame and carrying small plates t, which form the rest when turned down, as shown by dotted lines in Fig. 3, by means of a screw-head v, fixed to one end of the spindle r. A pin w is provided, against which a plate rests when turned back.

In the case of a violin or other orchestral music stand the apparatus can be placed on it and worked in the same way as in the case of a piano. In playing the violin, clarinet, and the like the buttons can be pressed in or the lever-handles pressed down by the end of the instrument, thus avoiding any pause while turning a leaf.

The desk of a violin or other music stand can be permanently or removably fitted with the leaf-turner, as shown in Figs. 5, 6, and 7. The rods c are carried up at the back of the desk through loops or eyes secured to the desk and the apparatus worked by hand or by a foot-pedal.

A movable music-rest, as hereinbefore described, can be attached and worked through slot-holes cut in the desk.

The music-desk of a piano, organ, or harmonium can be fitted with the leaf-turner in various designs and can have hinges to allow the desk to fold up or back.

What I claim, and desire to secure by Letters Patent, is—

In a music holder and turner, the combination with a vertical frame supported on a horizontal box at the bottom thereof, and provided with horizontal or transverse plates secured to the back thereof, of a series of vertical rods mounted at the back of the frame and passing through said plates into said box where they are pivotally supported, and where each is provided with operative devices for rotating it in either direction, parts of which extend through the front wall of the box, by which said devices are operated, and each of said vertical rods being provided at its upper end with a horizontal part or head above the frame and adapted to be turned in front thereof and a two-part clip or loop at the outer end of said horizontal part which depends therefrom and is adapted to grasp the music-leaves when the latter are in position on the frame, and turn the same when the rods are rotated, and a movable rest for the music adapted to be turned backward of the frame or in front thereof, consisting of a horizontal spindle revolubly supported on the frame above the bottom thereof and provided with short plates or supports which form the rest when turned down or forward, said spindle being provided with a head by which it is operated, and a central vertical rod adapted to hold the music on the rest, the lower end of which is secured in the box at the bottom of the frame, substantially as shown and described.

In testimony whereof I have affixed my signature in presence of two witnesses.

FREDERICK TALBOT JOYCE.

Witnesses:
H. G. SILK,
B. SMALLWOOD.